Aug. 4, 1931.         G. HESS         1,816,970
ANCHOR SOCKET
Filed March 3, 1930

Inventor:
Gottfried Hess
By
Attorney

Patented Aug. 4, 1931

1,816,970

UNITED STATES PATENT OFFICE

GOTTFRIED HESS, OF WINZNAU, NEAR OLTEN SWITZERLAND

ANCHOR SOCKET

Application filed March 3, 1930, Serial No. 432,859, and in Germany March 11, 1929.

The invention relates to an anchor-socket for fastening apparatus or current-carrying parts to switch-boards and it is characterized by a flanged screw-socket having a split inserting portion and an internal thread ending in a conical portion which is spread apart or expanded by means of a conically ending thimble screwed into the socket and provided with an internal thread for the fastening screw, thus producing a safe fixing of the socket. The flanged portion is generally provided with means for giving a hold to tightening instruments such as screw-drivers or the like.

The accompanying drawings represent a working example of the invention.

Figure 1:
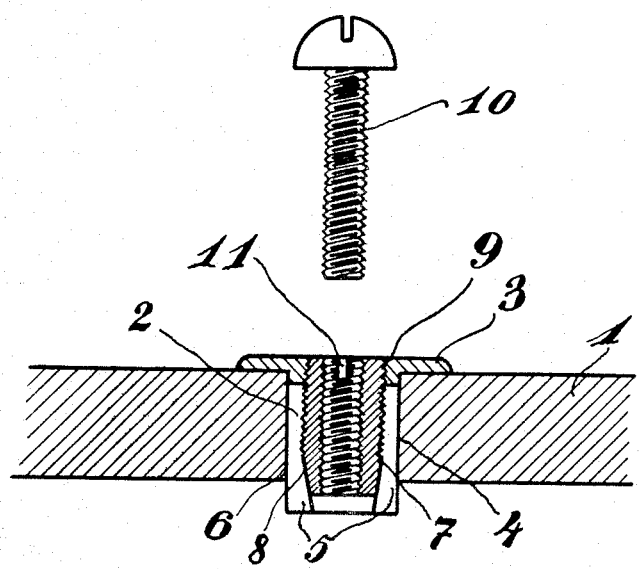

Fig. 1 being a vertical section of the socket wedged tight, and

Figure 2:
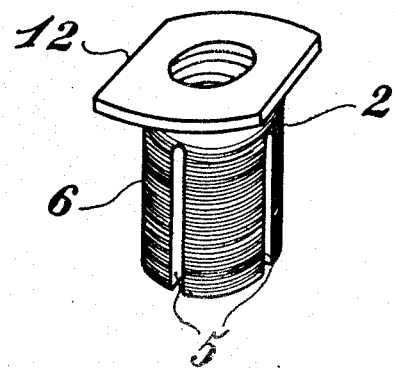

Fig. 2 being a perspective view of the socket.

According to the drawings the anchor-socket which is to be fastened to the switch-board 1 comprises a threaded sleeve 2 having a flange 3 which bears on the face of the switchboard, and a cylindrical portion 6 formed with four slits 5, this portion 6 fitting into the hole 4 in the board. The internal thread of the tapering sleeve is limited at 7 by narrowing or tapering the bore and is adapted to receive a thimble 9 having a conical end portion and an internal thread for receiving a screw 10 as means for fixing a device to the switch-board. The thimble is provided with a slot 11 for a screw-driver, and the flanged part 3 is provided with flats 12 as a hold for a wrench. But other holding means could be provided.

The diameter of the hole 4 in the board corresponds with the diameter of the cylindrical portion 6. For inserting the thimble 9, this thimble has to be screwed down until it is even with the sleeve. For this the socket is held fast by means of a wrench. When introducing the thimble, the split portion 6 of the sleeve is expanded and constitutes, in combination with the thimble, an anchor-socket for holding in position a device (not shown) which has to be fixed to the switch-board. Sleeve and thimble will be adapted to the size of the object to be fixed. The sleeve will be preferably extended some millimeters beyond the backside of the switch-board so that the wedged portion is more free to expand and to afford a more effective hold.

What I claim as new is:

An anchor-socket for fastening current-carrying devices to relatively thin slabs serving as switch-boards, comprising a sleeve provided with a lateral flange to bear against the face of said slab, said sleeve having a cylindrical portion longitudinally slitted up to said flange and fitted in a hole of the slab and formed with an internal thread limited by a conically-contracted end portion; an externally and internally threaded hollow thimble fitting in the sleeve and having its external thread engaged with the internal thread of said sleeve, said thimble terminated in a conical portion which fits in the contracted portion of the sleeve so as to expand the same and to remain immovable against any turning effect of a fastening screw received by the internal thread, and means provided on the flange and screw to permit those elements to be engaged by holding instruments for fixing the socket.

In testimony whereof I affix my signature.

GOTTFRIED HESS.